(12) United States Patent
Donley et al.

(10) Patent No.: US 11,526,589 B2
(45) Date of Patent: Dec. 13, 2022

(54) WEARER IDENTIFICATION BASED ON PERSONALIZED ACOUSTIC TRANSFER FUNCTIONS

(71) Applicant: Meta Platforms Technologies, LLC, Menlo Park, CA (US)

(72) Inventors: Jacob Ryan Donley, Kirkland, WA (US); Vladimir Tourbabin, Sammamish, WA (US); Vamsi Krishna Ithapu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 651 days.

(21) Appl. No.: 16/526,498

(22) Filed: Jul. 30, 2019

(65) Prior Publication Data

US 2021/0034725 A1 Feb. 4, 2021

(51) Int. Cl.
*G06F 21/32* (2013.01)
*H04R 1/40* (2006.01)
(Continued)

(52) U.S. Cl.
CPC .............. *G06F 21/32* (2013.01); *H04R 1/406* (2013.01); *H04R 3/005* (2013.01); *H04R 5/027* (2013.01);
(Continued)

(58) Field of Classification Search
CPC ... H04S 7/30; H04S 7/00; H04S 7/304; H04S 7/303; H04S 2400/15; H04S 2420/01;
(Continued)

(56) References Cited

U.S. PATENT DOCUMENTS

2012/0328107 A1 12/2012 Nystrom et al.
2013/0036452 A1* 2/2013 Yamashita .............. G06F 21/32
726/3
(Continued)

FOREIGN PATENT DOCUMENTS

GB         2545222 A      6/2017
WO     WO 2018/213746 A1  11/2018
WO     WO-2018213746 A1 * 11/2018 ............. G06F 21/32

OTHER PUBLICATIONS

PCT International Search Report and Written Opinion, PCT Application No. PCT/US2020/043529, dated Oct. 21, 2020, nine pages.
(Continued)

*Primary Examiner* — Leshui Zhang
(74) *Attorney, Agent, or Firm* — Fenwick & West LLP

(57) ABSTRACT

A wearable device includes an audio system. In one embodiment, the audio system includes a sensor array that includes a plurality of acoustic sensors. When a user wears the wearable device, the audio system determines an acoustic transfer function for the user based upon detected sounds within a local area surrounding the sensor array. Because the acoustic transfer function is based upon the size, shape, and density of the user's body (e.g., the user's head), different acoustic transfer functions will be determined for different users. The determined acoustic transfer functions are compared with stored acoustic transfer functions of known users in order to authenticate the user of the wearable device.

20 Claims, 7 Drawing Sheets

(51) Int. Cl.
    *H04R 3/00*     (2006.01)
    *H04R 5/027*     (2006.01)
    *H04S 7/00*     (2006.01)

(52) U.S. Cl.
    CPC ............ *H04S 7/30* (2013.01); *H04S 2400/15* (2013.01); *H04S 2420/01* (2013.01)

(58) Field of Classification Search
    CPC ............... H04W 12/65; H04R 2430/20; H04R 2430/23; H04R 2499/15; H04R 1/1041; H04R 1/10; H04R 1/406; H04R 1/40; H04R 3/005; H04R 5/027; H04R 25/00; G06F 3/165; G06F 3/011; G06F 3/016; G06F 3/167; G06F 3/16; G06F 21/32; G06F 21/30; G06F 21/31; G06F 21/305; G02B 27/017
    USPC ........ 726/17, 18, 19, 20, 21, 27, 28, 29, 30; 381/1–23, 23.1, 300, 303, 304, 305, 306, 381/309, 310, 311, 26, 56, 57, 60, 61, 66, 381/312–321, 73.1, 74, 334, 91, 92, 94.1, 381/110, 111, 112, 113, 114, 115, 122, 381/123; 700/94
    See application file for complete search history.

(56) References Cited

U.S. PATENT DOCUMENTS

2018/0139565 A1\*   5/2018   Norris ..................... H04S 1/007
2019/0213313 A1    7/2019   Koshinaka et al.

OTHER PUBLICATIONS

International Preliminary Report on Patentability for International Application No. PCT/US2020/043529, dated Feb. 10, 2022, 8 pages.

\* cited by examiner

500

```
┌─────────────────────────────────────────────────────────────┐
│  Determine that user is wearing device containing audio system │
│                            510                              │
└─────────────────────────────────────────────────────────────┘
                              │
                              ▼
┌- - - - - - - - - - - - - - - - - - - - - - - - - - - - - - ┐
│  Cause emission of controlled sound or prompt user to generate │
│                           sound                             │
│                            520                              │
└- - - - - - - - - - - - - - - - - - - - - - - - - - - - - - ┘
                              │
                              ▼
┌─────────────────────────────────────────────────────────────┐
│  Using sensor array, determine acoustic transfer function for user │
│                            530                              │
└─────────────────────────────────────────────────────────────┘
                              │
                              ▼
┌─────────────────────────────────────────────────────────────┐
│  Compare determined acoustic transfer function with stored  │
│  acoustic transfer functions associated with authorized users │
│                            540                              │
└─────────────────────────────────────────────────────────────┘
                              │
                              ▼
┌─────────────────────────────────────────────────────────────┐
│  Identify user based upon comparison of acoustic transfer functions │
│                            550                              │
└─────────────────────────────────────────────────────────────┘
```

WEARER IDENTIFICATION BASED ON PERSONALIZED ACOUSTIC TRANSFER FUNCTIONS

BACKGROUND

The present disclosure generally relates to the dynamic determination of personalized acoustic transfer functions and the use of acoustic transfer functions for user identification and security purposes.

Wearable devices, such as smart glasses, audio headsets, and augmented reality devices, can be used to provide personalized experiences and content to their users. It is desirable to identify or authenticate a user, such as to provide personalized content. In addition, being able to identify who is wearing a device at any given time can prevent unauthorized users from accessing private or sensitive data.

SUMMARY

Acoustic transfer functions represent relationships between a sound from a source location and how the sounds are detected, for example, by a sensor array or by a person. For example, a sound perceived at two ears of a person can be different, depending on a direction or location of the sound source with respect to each ear, as well as on objects within the local area from which the sound can be reflected or travel through. In wearable devices containing an audio system, acoustic transfer functions may be used to present audio content to the user, allowing the user to perceive the presented audio content as originating from particular locations within the local area. As different users have different head geometries that may affect sounds in different ways, different acoustic transfer functions may be associated with different users for the purposes of presenting audio content.

Embodiments relate to an audio system for identifying a user based upon determined acoustic transfer functions. In some embodiments, the audio system comprises a sensor array that includes a plurality of acoustic sensors that are configured to detect a sound transmitted within a local area of the audio system. The audio system may further comprise a controller. The controller is configured to determine an acoustic transfer function based in part on the detected sound, wherein the acoustic transform function defines a transformation of the sound caused in part by a head of a user of the audio system, and to identify the user based on the acoustic transfer function.

In some embodiments, a method for identifying a user based upon determined acoustic transfer functions is disclosed. The method may comprise detecting a sound transmitted within a local area of a headset using a sensor array, the sensor array including a plurality of acoustic sensors. The method may further comprise determining at least one acoustic transfer function associated with a user based in part on the detected sound, wherein the at least one acoustic transfer function defines a transformation of the sound cause in part by a head of a user of the headset. The method may further comprise identifying the user based on the determined acoustic transfer function.

In some embodiments, a non-transitory computer-readable medium storing instructions is disclosed, then, when executed by one or more processors, cause the one or more processors to perform operations. The operations may comprise detecting a sound transmitted within a local area of a headset using a sensor array, the sensor array including a plurality of acoustic sensors. The operations may further comprise determining at least one acoustic transfer function associated with a user based in part on the detected sound, wherein the at least one acoustic transfer function defines a transformation of the sound cause in part by a head of a user of the headset. The operations may further comprise identifying the user based on the determined acoustic transfer function.

BRIEF DESCRIPTION OF THE DRAWINGS

Figure (FIG.) 1A is an example illustrating a wearable headset implemented as an eyewear device, in accordance with one or more embodiments.

FIG. 5 is a flowchart illustrating a process of authenticating a user of a wearable device including an audio system based upon one or more determined acoustic transfer functions, in accordance with one or more embodiments.

Figure 1A:
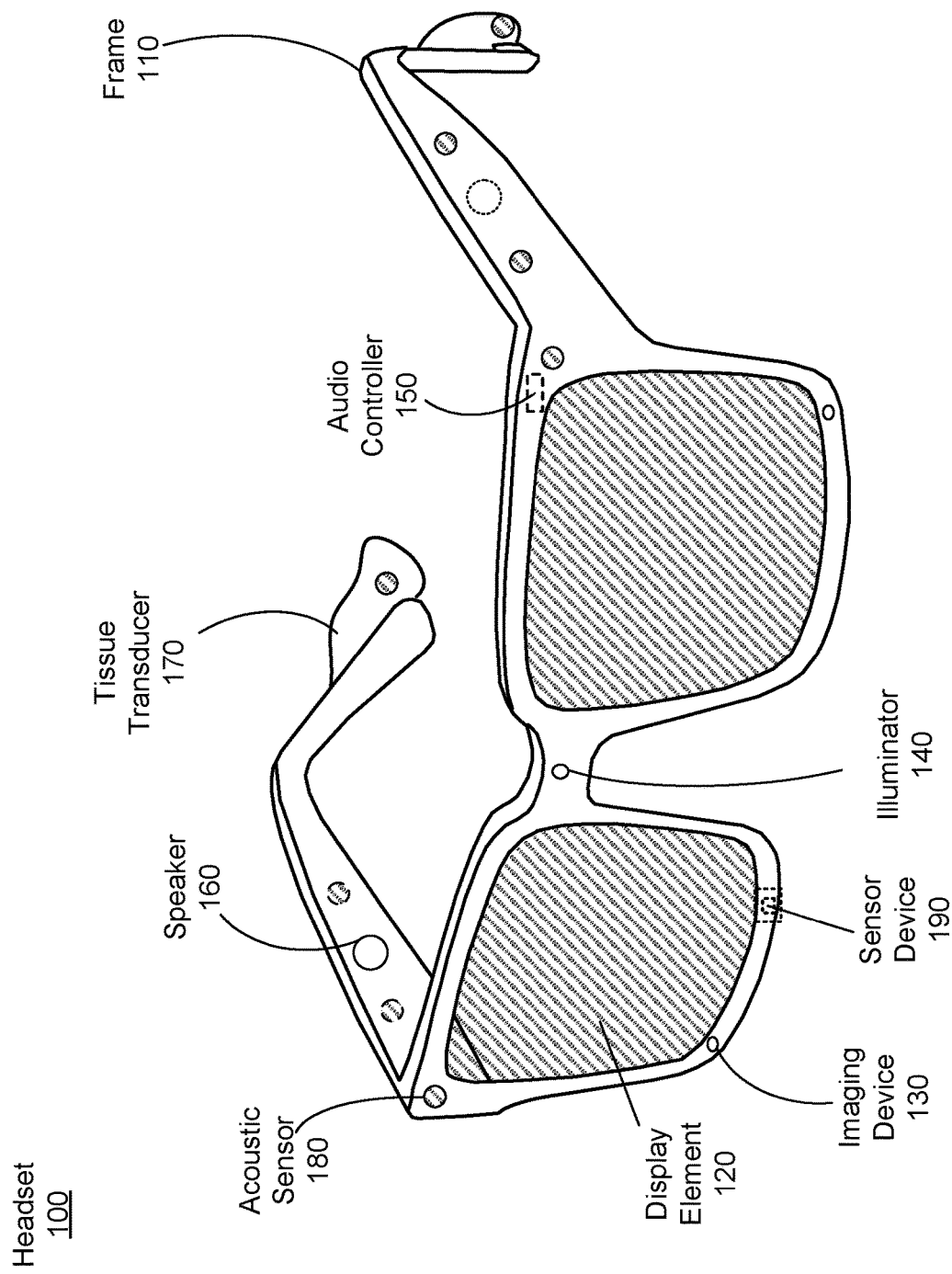
FIG. 1B is a perspective view of a headset implemented as a head-mounted display, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An acoustic transfer function represents the relationship between a sound originating from a source location and how the sound is detected, for example, by a sensor array or by a person. For example, sound reaching a listener's ear from a source location may include sound that travels directly from the source location to the listener's ear, as well as sound that reaches the ear indirectly. This indirect sound may include sound that reflected off the listener's head and/or other objects in the local area, and may also include sound that travels through the listener's head. The indirect sound may be transformed via diffraction or reflection, causing certain frequencies to be boosted and others to be attenuated. As such, how sound from a particular source location will be perceived by the listener may depend upon the size, shape, and/or density of the listener's head, ears, and face. These same principles may also be applied to a sensor array of a wearable device worn by a user. The sensor array may contain at least two microphones in different locations configured to detect sounds within a local area. How sounds from the source location are received by each microphone of the sensor array may depend upon the location of each microphone relative to the source location, as well as the shape, size, and/or density of the user's head, ear, and face, which affects how sound reflects off different portions of the user's body and/or travels through the user's body to indirectly reach at least one microphone of the sensor array. A sensor array (or a person wearing a device having a sensor array) may have several associated acoustic transfer functions corresponding to different source locations in a local area surrounding the sensor array (or surrounding the person wearing the sensor array) and/or a frequency range associated with the detected sounds.

Because the geometry of each user's head is unique to the individual user, when a wearable device having a sensor array is worn by a first user, the sensor array of the wearable device may be associated with a first set of acoustic transfer functions that are different from a second set of acoustic transfer functions corresponding to when the wearable device is worn by a second user, due to the different properties of the heads of the first and second user (e.g., different head shape, size, and/or density). In this way, determined acoustic transfer functions for the sensor array can be leveraged as an indicator to identify which user is currently wearing the wearable device. As used herein, a user's head shape, size, and/or density may also encompass features on the user's face (e.g., size and shape of the user's nose) and features relating to the user's ears (e.g., shape of the ear and/or ear canal).

An audio system of the wearable device detects sound to generate one or more acoustic transfer functions for a user. In one embodiment, the audio system includes a sensor array that includes a plurality of acoustic sensors and a controller. Each acoustic sensor is configured to detect sounds within a local area surrounding the sensor array. In some embodiments, at least some of the plurality of acoustic sensors are coupled to a near-eye display (NED) configured to be worn by the user. As the user wears the wearable device, the acoustic sensors of the sensor array detect sounds within the local area surrounding the use. The detected sounds may comprise controlled sounds and uncontrolled sounds. Uncontrolled sounds are sounds that are not controlled by the audio system and happen in the local area (e.g., naturally occurring ambient noise). Controlled sounds are sounds that are controlled by the audio system (e.g., emitted by one or more speakers of the audio system) and/or prompted by the audio system (e.g., the audio system prompts the user to produce a sound).

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset connected to a host computer system, a standalone headset, a mobile device or computing system, or any other hardware platform capable of providing artificial reality content to one or more viewers.

Eyewear Device Configuration

FIG. 1A is an example illustrating a wearable device 100 (e.g., a headset) implemented as an eyewear device, in accordance with one or more embodiments. The wearable device 100 is a headset with an eyewear device that presents media to a user. In one embodiment, the wearable device 100 may be a near-eye display (NED). In some embodiments, the eyewear device is a near eye display (NED). In general, the wearable device 100 may be worn on the face of a user such that content (e.g., media content) is presented using a display assembly and/or an audio system. However, the wearable device 100 may also be used such that media content is presented to a user in a different manner. Examples of media content presented by the wearable device 100 include one or more images, video, audio, or some combination thereof. The wearable device 100 includes a frame, and may include, among other components, a display assembly including one or more display elements 120, a depth camera assembly (DCA), an audio system, and a position sensor 190. While FIG. 1A illustrates the components of the wearable device 100 in example locations on the wearable device 100, the components may be located elsewhere on the wearable device 100, on a peripheral device paired with the wearable device 100, or some combination thereof. Similarly, there may be more or fewer components on the wearable device 100 than what is shown in FIG. 1A.

The frame 110 holds the other components of the wearable device 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the wearable device 100. As illustrated the headset includes a display element 120 for each eye of a user. In some embodiments, a display element 120 generates image light that is provided to an eyebox of the wearable device 100. The eyebox is a location in space that an eye of user occupies while wearing the wearable device 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the wearable device 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the wearable device 100. The local area is the area surrounding the wearable device 100. For example, the local area may be a room that a user wearing the wearable device 100 is inside, or the user wearing the wearable device 100 may be outside and the local area is an outside area. In this context, the wearable device 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the wearable device 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The sensor device 190 generates one or more measurement signals in response to motion of the wearable device 100. The sensor device 190 may be located on a portion of the frame 105 of the wearable device 100. The sensor device 190 may include a position sensor, an inertial measurement unit (IMU), or both. Some embodiments of the wearable device 100 may or may not include the sensor device 190 or may include more than one sensor device 190. In embodiments in which the sensor device 190 includes an IMU, the IMU generates fast calibration data based on measurement signals from the sensor device 190. Examples of sensor devices 190 include: one or more accelerometers, one or more gyroscopes, one or more magnetometers, another suitable type of sensor that detects motion, a type of sensor used for error correction of the IMU, or some combination thereof. The sensor device 190 may be located external to the IMU, internal to the IMU, or some combination thereof.

Based on the one or more measurement signals, the sensor device 190 estimates a current position of the wearable device 100 relative to an initial position of the wearable device 100. The estimated position may include a location of the wearable device 100 and/or an orientation of the wearable device 100 or the user's head wearing the wearable device 100, or some combination thereof. The orientation may correspond to a position of each ear relative to the reference point. In some embodiments, the sensor device 190 uses the depth information and/or the absolute positional information from a DCA to estimate the current position of the wearable device 100. The sensor device 190 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the wearable device 100 from the sampled data. For example, the IMU integrates the measurement signals received from the accelerometers over time to estimate a velocity vector and integrates the velocity vector over time to determine an estimated position of a reference point on the wearable device 100. Alternatively, the IMU provides the sampled measurement signals to the controller 150, which determines the fast calibration data. The reference point is a point that may be used to describe the position of the wearable device 100. While the reference point may generally be defined as a point in space, however, in practice the reference point is defined as a point within the wearable device 100.

In some embodiments, the wearable device 100 may provide for simultaneous localization and mapping (SLAM) for a position of the wearable device 100 and updating of a model of the local area. For example, the wearable device 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the wearable device 100 within the room.

In some embodiments, the sensor device 190 may comprise one or more sensors configured to determine one or more parameters relating to a user of the wearable device 100, such as whether the wearable device is currently being worn by a user. For example, the sensor device 190 may include a proximity sensor (e.g., IR proximity sensor), touch sensor, or some combination thereof usable to determine if a user is currently wearing the wearable device 100. The wearable device may perform one or more functions based upon a determination that a user is currently wearing the wearable device 100, such as attempting to authenticate the user, providing content to the user, allowing the user to access one or more functionalities of the wearable device, etc. For example, the wearable device 100 may attempt to authenticate a user and log the user into a user account in response to determining that a user is wearing the wearable device, and log the user out of the user account in response to determining that the user is no longer wearing the wearable device.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the wearable device 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The audio system detects sound to generate one or more acoustic transfer functions for a user of the wearable device 100. An acoustic transfer function characterizes how a sound is received from a point in space. The acoustic transfer functions may be array transfer functions (ATFs), head-related transfer functions (HRTFs), other types of acoustic transfer functions, or some combination thereof. The audio system may then use the one or more acoustic transfer functions to authenticate the user, generate audio content for the user, etc. The audio system of the wearable device 100 includes a sensor array and the controller 150.

The sensor array detects sounds within the local area of the wearable device 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the wearable device 100, placed on an interior surface of the wearable device 100, separate from the wearable device 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the wearable device 100.

The sensor array detects sounds within the local area surrounding the sensor array. The local area is the environment that surrounds the wearable device 100. For example, the local area may be a room that a user wearing the wearable device 100 is inside, or the user wearing the wearable device 100 may be outside and the local area is an outside area in which the sensor array is able to detect sounds. Detected sounds may be uncontrolled sounds or controlled sounds. Uncontrolled sounds are sounds that are not controlled by the audio system and happen in the local area. Examples of uncontrolled sounds may be naturally occurring ambient noise. In this configuration, the audio system may be able to calibrate the wearable device 100 using the uncontrolled sounds that are detected by the audio system. Controlled sounds are sounds that are controlled by the audio system. Examples of controlled sounds may be one or more signals output by an external system, such as a speaker, a speaker assembly, a calibration system, or some combination thereof. In some embodiments, controlled sounds may also include sounds that are prompted by the audio system. For example, the audio system may prompt the user of the wearable device 100 to create a sound (e.g., by speaking a predetermined phrase). While the wearable device 100 may be calibrated using uncontrolled sounds, in some embodiments, the external system may be used to calibrate the wearable device 100 during a calibration process. Each detected sound (uncontrolled and controlled) may be associated with a frequency, an amplitude, a duration, or some combination thereof.

The configuration of the acoustic sensors 180 of the sensor array may vary. While the wearable device 100 is shown in FIG. 1 as having eight acoustic sensors 180, the number of acoustic sensors 180 may be increased or decreased. Increasing the number of acoustic sensors 180 may increase the amount of audio information collected and the sensitivity and/or accuracy of the audio information. Decreasing the number of acoustic sensors 180 may decrease the computing power required by the controller 150 to process the collected audio information. In addition, the position of each acoustic sensor 180 of the sensor array may vary. The position of an acoustic sensor 180 may include a defined position on the user, a defined coordinate on the frame 110, an orientation associated with each acoustic sensor, or some combination thereof. For example, the acoustic sensors 180 may be positioned on a different part of the user's ear, such as behind the pinna or within the auricle or fossa, or there may be additional acoustic sensors on or surrounding the ear in addition to the acoustic sensors 180 inside the ear canal. Having an acoustic sensor positioned next to an ear canal of a user enables the sensor array to collect information on how sounds arrive at the ear canal. The acoustic sensors 180 on the frame 115 may be positioned along the length of the temples, across the bridge, above or below the display elements 120, or some combination thereof. The acoustic sensors 180 may be oriented such that the sensor array is able to detect sounds in a wide range of directions surrounding the user wearing the wearable device 100.

The controller 150 processes information from the sensor array that describes sounds detected by the sensor array. The information associated with each detected sound may include a frequency, an amplitude, and/or a duration of the detected sound. In some embodiments, for each detected sound, the controller 150 performs a DoA estimation. The DoA estimation is an estimated direction from which the detected sound arrived at an acoustic sensor of the sensor array. If a sound is detected by at least two acoustic sensors of the sensor array, the controller 150 can use the known positional relationship of the acoustic sensors and the acoustic signal from each acoustic sensor to estimate a source location of the detected sound, for example, via triangulation or another DoA algorithm. The accuracy of the source location estimation may increase as the number of acoustic sensors that detected the sound increases and/or as the distance between the acoustic sensors that detected the sound increases.

In some embodiments, the controller 150 populates an audio data set with information. The information may include a detected sound and parameters associated with each detected sound. Example parameters may include a frequency, an amplitude, a duration, a DoA estimation, a source location, or some combination thereof. Each audio data set may correspond to a different source location relative to the wearable device 100 and include one or more sounds having that source location. This audio data set can be used to determine one or more acoustic transfer functions for that source location. The one or more acoustic transfer functions may be stored in the data set. In alternate embodiments, each audio data set may correspond to several source locations relative to the wearable device 100 and include one or more sounds for each source location. For example, source locations that are located relatively near to each other (e.g., within a threshold distance) may be grouped together. The controller 150 may populate the audio data set with information as sounds are detected by the sensor array. The controller 150 may further populate the audio data set for each detected sound as a DoA estimation is performed or a source location is determined for each detected sound.

In some embodiments, the controller 150 selects the detected sounds for which it performs a DoA estimation and/or source location determination. The controller 150 may select the detected sounds based on the parameters associated with each detected sound stored in the audio data set. The controller 150 may evaluate the stored parameters associated with each detected sound and determine if one or more stored parameters meet a corresponding parameter condition. For example, a parameter condition may be met if a parameter is above or below a threshold value or falls within a target range. If a parameter condition is met, the controller 150 performs a DoA estimation and/or source location determination for the detected sound. For example, the controller 150 may perform a DoA estimation and/or source location determination for detected sounds that have a frequency within a frequency range, an amplitude above a threshold amplitude, a duration below a threshold duration, other similar variations, or some combination thereof. Parameter conditions may be set by a user of the audio system, based on historical data, based on an analysis of the information in the audio data set (e.g., evaluating the collected information of the parameter and setting an average), or some combination thereof. The controller 150 may create an element in the audio set to store the DoA estimation and/or source location of the detected sound. In some embodiments, the controller 150 may update the elements in the audio set if data is already present.

In some embodiments, the controller 150 may receive position information of the wearable device 100 from a system external to the wearable device 100. The position information may include a location of the wearable device 100, an orientation of the wearable device 100 or the user's head wearing the wearable device 100, or some combination thereof. The position information may be defined relative to a reference point. The orientation may correspond to a position of each ear relative to the reference point. Examples of systems include an imaging assembly, a console (e.g., as described in FIG. 6), a simultaneous localization and mapping (SLAM) system, a depth camera assembly, a structured light system, or other suitable systems. In some embodiments, the wearable device 100 may include sensors that may be used for SLAM calculations, which may be carried out in whole or in part by the controller 150. The controller 150 may receive position information from the system continuously or at random or specified intervals. In some embodiments, the received position information may be used to determine a source location of detected sounds. For example, in embodiments where the detected sounds comprise controlled sounds produced by an external system, the controller 150 may determine the source location based upon a known position of the external system and a current position of the wearable device 100.

Based on parameters of the detected sounds, the controller 150 generates one or more acoustic transfer functions associated with the audio system. The acoustic transfer functions may be ATFs, HRTFs, other types of acoustic transfer functions, or some combination thereof. An ATF characterizes how the sensor array receives a sound from a point in space. Specifically, the ATF defines the relationship between parameters of a sound at its source location and the parameters at which the sensor array detected the sound. Parameters associated with the sound may include frequency, amplitude, duration, a DoA estimation, etc. In some embodiments, at least some of the acoustic sensors of the sensor array are coupled to the wearable device 100 that is worn by a user. The ATF for a particular source location relative to the sensor array may differ from user to user due to a person's anatomy (e.g., ear shape, shoulders, etc.) that affects the sound as it travels to the person's ears. Accordingly, the ATFs of the sensor array are personalized for each user wearing the wearable device 100.

The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. For example, the controller 150 may generate two HRTFs for the user, one for each ear, based upon a pair of acoustic sensors located proximate to each ear of the user (e.g., within a threshold distance of an entrance of the ear canal (and may be located at the entrance to the ear canal), or within the ear canal of the ear). An HRTF or a pair of HRTFs can be used to create audio content that includes sounds that seem to come from a specific point in space. Several HRTFs may be used to create surround sound audio content (e.g., for home entertainment systems, theater speaker systems, an immersive environment, etc.), where each HRTF or each pair of HRTFs corresponds to a different point in space such that audio content seems to come from several different points in space. In some embodiments, the controller 150 may update a pre-existing acoustic transfer function based on the DoA estimation of each detected sound. In some embodiments, as the position of the wearable device 100 changes within the local area, the controller 150 may generate a new acoustic transfer function or update a pre-existing acoustic transfer function accordingly.

Figure 1B:
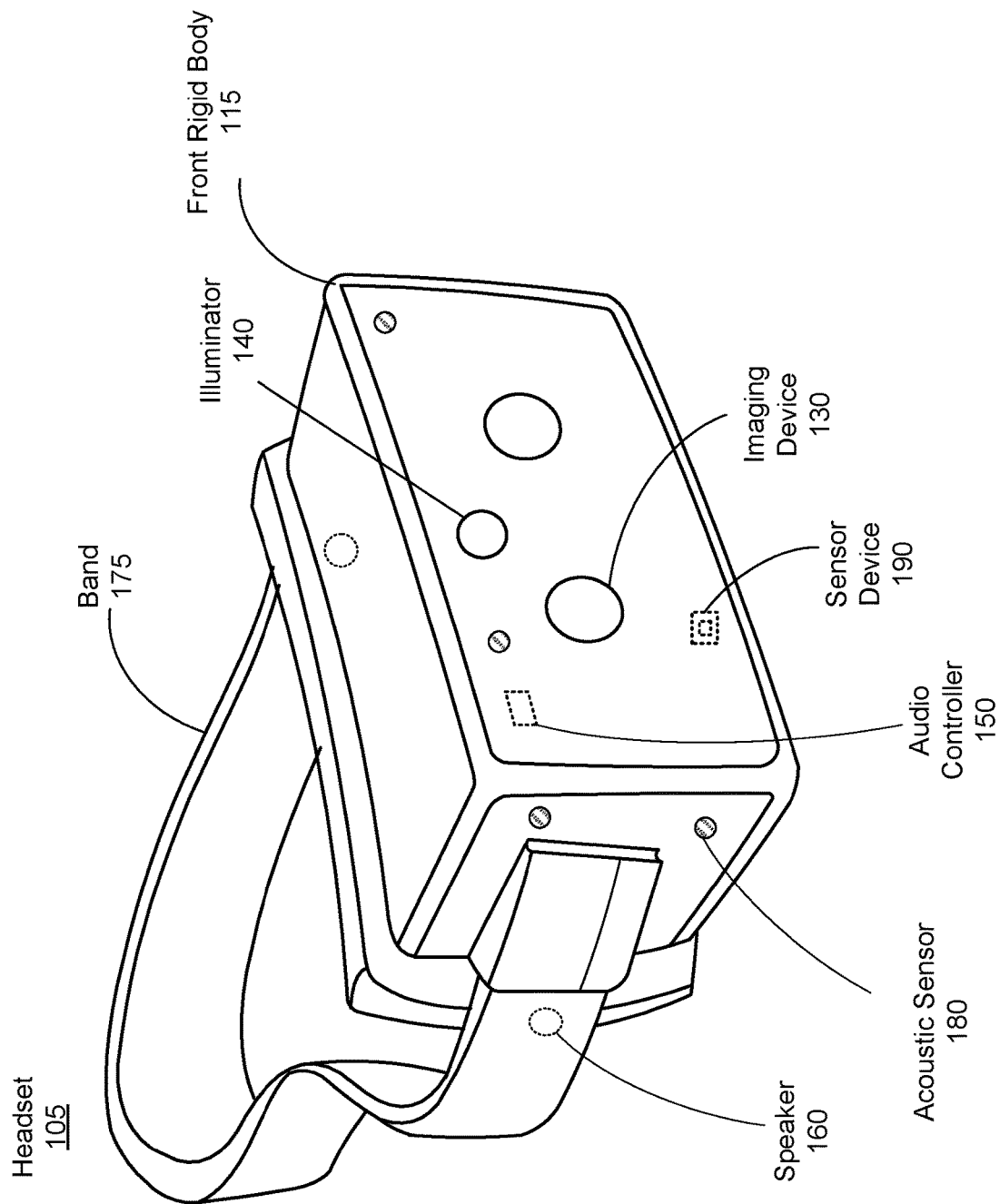

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 190 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the sensor device 190. Although FIG. 1B illustrates the components of the HMD in certain locations on the headset 105, it is understood that in other embodiments, the components of the HMD may be arranged differently. For example, FIG. 1B illustrates a speaker 160 mounted on the band 175. In other embodiments, the speakers 160 may be on the band 175, on the front rigid body 115, on a separate structure such that the spearkers 160 are positioned adjacent to or within the ears of the user, or some combination thereof.

Audio System Overview

Figure 2:
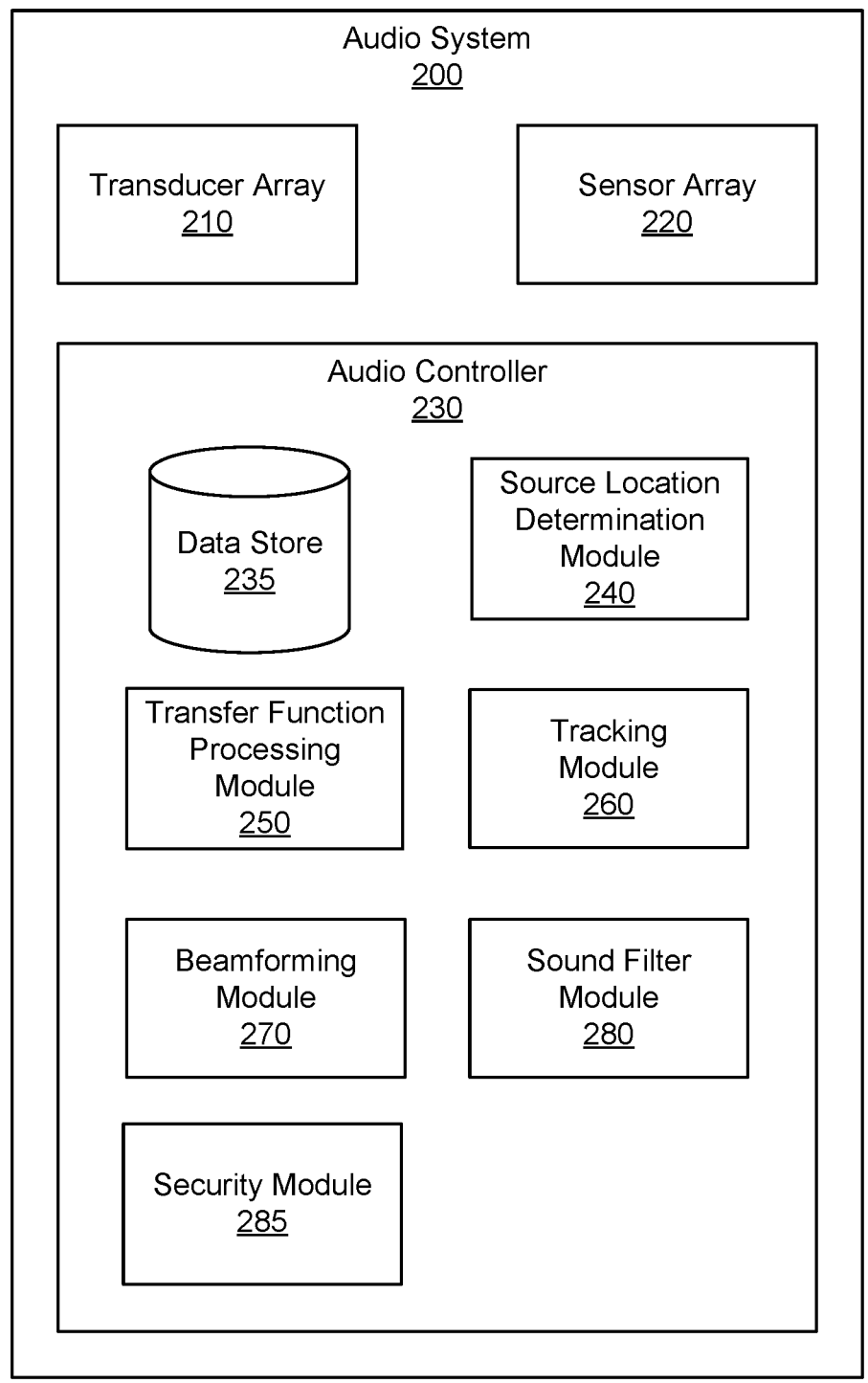
FIG. 2 is a block diagram of an audio system, in accordance with one or more embodiments.

FIG. 2 is a block diagram of an audio system 200, in accordance with one or more embodiments. The audio system in FIG. 1 may be an embodiment of the audio system 200. The audio system 200 detects sound to generate one or more acoustic transfer functions for a user, which can be used to authenticate the user and/or to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the wearable device 100). In alternate embodiments, the transducer array 210 may be a plurality of speakers that are separate from the wearable device (e.g., coupled to an external console). In one embodiment, the transducer array 210 can transmit controlled test sounds, which are received by the sensor array 220 and can be analyzed to generate acoustic transfer functions for the wearable device 100. Multiple test sounds with varying frequencies, amplitudes, durations, or sequences can be produced by the transducer array 210. In some embodiments, the audio controller 230 may also issue auditory instructions to the user through the transducer array 210 (e.g., prompts user to create a sound, move about an area, etc.).

The sensor array 220 detects sounds within a local area surrounding the audio system 200. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, a contact microphone, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

As described with regards to FIG. 1, detected sounds may be uncontrolled sounds or controlled sounds. Each detected sound may be associated with audio information such as a frequency, an amplitude, a duration, or some combination thereof. Each acoustic sensor of the sensor array 220 may be active (powered on) or inactive (powered off). The acoustic sensors are activated or deactivated in accordance with instructions from the audio controller 230. In some embodiments, all acoustic sensors in the sensor array 220 may be active to detect sounds, or a subset of the plurality of acoustic sensors may be active. An active subset includes at least two acoustic sensors of the plurality of acoustic sensors. An active subset may include, e.g., every other acoustic sensor, a pre-programmed initial subset, a random subset, or some combination thereof.

The audio controller 230 controls operation of the audio system 200. In the embodiment of FIG. 2, the audio controller 230 includes a data store 235, a source location determination module 240, a transfer function processing module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset (e.g., learned transfer function storage stored by the data storage 235 and the security module 285 may be implemented as part of a separate security system in communication with the audio system 200).

The data store 235 stores data for use by the audio system 200. Data in the data store 235 may include sounds recorded in the local area of the audio system 200, audio content, calculated HRTFs, transfer functions for one or more sensors, ATFs for one or more of the acoustic sensors, sound source locations, virtual model of local area, direction of arrival estimates, sound filters, and other data relevant for use by the audio system 200, or any combination thereof.

The audio controller 230 processes information from the sensor array 220. In addition, the audio controller 230 controls other modules and devices of the audio system 200. The information associated with each detected sound may include a frequency, an amplitude, and/or a duration of the detected sound.

The source location determination module 220 is configured to localize sound sources in the local area based in part on information from the sensor array 220. Localization is a process of determining where sound sources are located relative to the user of the audio system 200. If a sound is detected by at least two acoustic sensors of the sensor array, the audio controller 230 can use the positional relationship of the acoustic sensors and a DoA estimation from each acoustic sensor to estimate a source location of the detected sound, for example, via triangulation. The estimated source location may be a relative position of the source location in the local area relative to a position of the sensor array 220. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the audio controller 230 may determine an absolute position of the source location if an absolute position of the sensor array 220 is known in the local area. The position of the sensor array 220 may be received from an external system (e.g., an imaging assembly, an AR or VR console, a SLAM system, a depth camera assembly, a structured light system etc.). The external system may create a virtual model of the local area, in which the local area and the position of the sensor array 220 are mapped. The received position information may include a location and/or an orientation of the sensor array in the mapped local area. The audio controller 230 may update the mapping of the local area with determined source locations of detected sounds. The audio controller 230 may receive position information from the external system continuously or at random or specified intervals. In some embodiments, the audio controller 230 selects the detected sounds for which it performs a source location determination (e.g., only sounds that satisfy certain parameter conditions).

In some embodiments, the source location determination module 220 may receive information from one or more additional sensors (e.g., sensor device 190) for use in determining a source location of a detected sound. For example, in some embodiments, one or more camera assemblies, gyroscopes, accelerometers, magnetometers, SLAM systems, and/or the like may be used to determine a ground truth position and orientation of the wearable device, from which relative positions of one or more controlled sound sources (e.g., external speakers) can be determined. For example, where the detected sound is a controlled sound emitted from an external speaker at a known location relative to a reference point, the source location determination module 220 uses a position of the audio system 200 relative to the reference to determine the source location of the sound relative to the audio system 200. In some embodiments, if the wearable device is moving (e.g., due to the user moving within the local area) as sound is detected, the additional sensor data may be used to compensate for the movement when determining the source location of the detected sound.

The transfer function processing module 250 is configured to generate one or more acoustic transfer functions. Generally, a transfer function is a mathematical function giving a corresponding output value for each possible input value. Based on parameters of the detected sounds, the transfer function processing module 250 generates one or more acoustic transfer functions associated with the audio system. The acoustic transfer functions may be ATFs, HRTFs, other types of acoustic transfer functions, or some combination thereof. An ATF characterizes how the microphone receives a sound from a point in space. In the embodiment of FIG. 2, an acoustic transfer function represents the relationship between a sound at its source location and how the sound is detected, for example, by a sensor array or by a person. As sounds originating from different source locations are detected, the transfer function processing module 250 may determine one or more acoustic transfer functions for each of the different source locations.

In one embodiment, the transfer function processing module 250 generates an array transfer function (ATF). The ATF characterizes how the sensor array 220 receives a sound from a point in space. Specifically, the ATF defines the relationship between parameters of a sound at its source location and the parameters at which the sensor array 220 detected the sound. Parameters associated with the sound may include frequency, amplitude, duration, etc. The transfer function processing module 250 may generate one or more ATFs for a particular source location of a detected sound. Factors that may affect how the sound is received by the sensor array 220 may include the arrangement and/or orientation of the acoustic sensors in the sensor array 220, any objects in between the sound source and the sensor array 220, an anatomy of a user wearing the eyewear device with the sensor array 220, or other objects in the local area. For example, if a user is wearing an eyewear device that includes the sensor array 220, the anatomy of the person (e.g., ear shape, shoulders, etc.) may affect the sound waves as it travels to the sensor array 220. In another example, if the user is wearing an eyewear device that includes the sensor array 220 and the local area surrounding the sensor array 220 is an outside environment including buildings, trees, bushes, a body of water, etc., those objects may dampen or amplify the amplitude of sounds in the local area. Generating and/or updating an ATF may improve the accuracy of the audio information captured by the sensor array 220.

In one embodiment, the transfer function processing module 250 generates one or more HRTFs. An HRTF characterizes how an ear of a person receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. The transfer function processing module 250 may generate a plurality of HRTFs for a single person, where each HRTF may be associated with a different source location, a different frequency range, or some combination thereof.

The security module 285 is configured to manage one or more security functions relating to user identification or authentication based upon determined acoustic transfer functions, using the acoustic transfer functions generated by transfer function processing module 250 for a user. The one or more security functions may include identifying or authenticating the user based upon their determined acoustic transfer functions based upon a comparison to previously learned acoustic transfer functions, logging in the user to a user profile or preventing the user from logging in to the user profile based upon the identification or authentication, allowing or preventing access to personalized content based upon the identification or authentication, etc. In order to be able to identify the user, determined acoustic transfer functions associated with the user are compared with previously determined acoustic transfer functions associated with known users stored in the data store 235 (hereinafter referred to as "personalized functions"). For example, in some embodiments, the security module 285, in response to receiving a determined function for the user, retrieves, from the data store 235, one or more personalized functions of one or more known users, and attempts to identify the user based on a comparison of the determined acoustic transfer function to the retrieved personalized functions. In some embodiments, the security module 285 only retrieves personalized functions that correspond to the source location associated with the determined acoustic transfer function, or are associated with source locations within a threshold distance of the source location of the determined acoustic transfer function. In some embodiments, instead of or in addition to being retrieved from the data store 235, the security module 285 may retrieve personalized functions associated with one or more known users from a transfer function storage located on a separate device in communication with the wearable device (e.g., the console 615 illustrated in FIG. 6) or a server accessible through a network (e.g., the mapping server 625 illustrated in FIG. 6). In addition, although the security module 285 is illustrated as being part of the audio system 200, in some embodiments, the functions of the security module 285 may be performed on a separate device (e.g., a console) or server, in which a remote security module receives acoustic transfer functions determined at the audio system 200 for which to perform one or more security functions.

The security module 285 may compare the determined acoustic transfer functions and the retrieved personalized functions using a regression model, a clustering model, or a machine-learning based classification model. For example, in some embodiments, the security module 285 comprises a neural network trained to determine a level of similarity between different acoustic transfer functions.

In some embodiments, the security module 285 determines a confidence level indicative of a level of similarity between the one or more acoustic transfer functions determined for a user and the one or more stored personalized functions corresponding to a known user, and authenticates the user as the known user if the confidence level exceeds a threshold value. In some embodiments, the confidence level may be based upon a number of acoustic transfer functions compared, a number of different locations associated with the compared functions, and/or the like. In some embodiments, if the confidence level is within a predetermined range, the security module 285 may prompt the user to provide additional authentication information (e.g., a password, fingerprint, voice recognition, etc.). In some embodiments, the confidence value may be aggregated with other security measures in order to form an aggregate confidence metric for identifying the user.

The data store 235 may store acoustics transfer functions determined for a known user (e.g., by the transfer function processing module 250) as personalized functions for the user. In some embodiments, the data store 235 stores, for each of one or more known users, one or more sets of personalized functions, each associated with a particular source location. Each source location may correspond to a location relative to the audio system 200, or to multiple locations within a particular region (e.g., a set of locations within a threshold distance of each other). In some embodiments, each set of personalized functions may be further divided into one or more subsets corresponding to different frequency ranges. In some embodiments, personalized functions determined for one or more users may be stored in a separate learned transfer function storage (not shown).

In some embodiments, the security module 285 performs an initial calibration operation for a user for populating the data store 235 with personalized functions associated with the user, so that the user can be identified using their personalized functions when they put on the wearable device at a later time. During the calibration operation, the user is authenticated and associated with a known user profile. For example, the user may enter a password on a user interface associated with the device, provide a fingerprint, and/or be authenticated using other means. When the user wears the wearable device, the transfer function processing module 250 determines one or more acoustic transfer functions for the user, which are stored in the data store 235 as the personalized functions for the user. For example, in some embodiments, the device is trained on the user after the user is first authenticated via some other means (e.g. fingerprint on puck, phone or other trusted device). While device is worn (e.g., as determined by infrared (IR) proximity sensor on inside of glasses frames, or other don/doff sensor), acoustic transfer functions are predicted/estimated the wearer during that "device-on" state."

In some embodiments, the security module 285 may cause one or more controlled sounds to be emitted, in order to determine acoustic transfer functions for the user corresponding to certain desired locations and/or frequency ranges. For example, the security module 285 may cause one or more speakers of the transducer array 210 to emit one or more predetermined sounds. In other embodiments, the security module 285 may cause a speaker of an external device in communication with the wearable device 100 to emit a predetermined sound. The security module 285 may prompt the user to create one or more sounds, such as speaking one or more phrases, clapping their hands, etc. In some embodiments, the security module 285 may prompt the user to move about a local area, in order to detect sounds originating for a larger variety of different locations relative to the device. The calibration operation may be performed until a threshold number of acoustic transfer functions are determined for the user, until acoustic transfer functions corresponding to certain source locations, a threshold number of source locations, and/or certain frequency ranges are determined for the user, and/or the like. In some embodiments, as the calibration operation continues to determine and/or update acoustic transfer functions for the user until a threshold confidence level is reached, as determined by a machine learning model.

Once the calibration operation has been performed and personalized functions are stored for a user, the user can be identified based upon their personalized functions when wearing the device at a later time. For example, when a determination is made that a user is wearing the wearable device, the transfer function processing module 250 dynamically determines one or more acoustic transfer functions for the user. In some embodiments, the transfer function processing module 250 determines the acoustic transfer functions for the user using uncontrolled sounds within a local area of the user. In some embodiments, the security module 285 may cause the emission of a controlled sound, or may prompt the user to create one or more sounds (e.g., by speaking a predetermined phrase), which can be used to determine an acoustic transfer function. The use of controlled sounds may allow for acoustic transfer functions associated with specific source locations or specific frequency ranges to be reliably determined, regardless of the level of uncontrolled sounds within the local area. In addition, in embodiments where the user is prompted to create one or more sounds, determination of acoustic transfer functions for the user may be performed in parallel with voice identification for the user. For example, the determination of acoustic transfer functions may leverage the spatial signature of the user when creating the sound (e.g., due to the sound originating from a consistent, predictable location relative to the audio sensor), while voice recognition functions may analyze a voice signature of the user based on the created sounds.

The determined acoustic transfer function may then be compared with at least a subset of the personalized functions for the user stored in the data store 235, where the user may be identified in response to a successful comparison (e.g., confidence value exceeding a threshold level), and be allowed access to personalized content and/or certain functionalities of the wearable device. In another example, a configuration of the wearable device specific to the user may be activated in response to identifying the user. On the other hand, if the comparison is unsuccessful (e.g., due to the difference between the determined acoustic transfer function and the stored personalized functions being too large), the user is not identified. In some embodiments, the user may be restricted from accessing certain data or functionalities of the wearable device. In some embodiments, results of the comparison may be used in combination with one or more additional identification methods, such as voice identification, eye/iris identification, fingerprint identification, etc., to identify the user (e.g., a weighted combination of confidence values associated with a plurality of different identification schemes).

In some embodiments, acoustic transfer functions may be used to facilitate user authentication. For example, the stored personalized functions of a user may serve as "fingerprint" for the user, similar to actual fingerprints, face ID systems, etc. The security module 285 may log a first user into a first user account upon identifying and authenticating the first user. At a later time, the security module 285 may determine that a different wearer is wearing the wearable device (e.g., by detecting the wearable device being removed and then re-worn, or by periodically determining an acoustic transfer function for the wearing user), and log out of the first user account in response to a determination that the current wearing user is different from the first user based upon a comparison of an acoustic transfer function determined for the user and stored personalized functions of the first user. In some embodiments, the security module 285 may log the first user into a user account or profile associated with a second user, if the first user is identified as being part of an authorized group associated with the second user (e.g., a family member of the second user).

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220. In some embodiments, the beamforming module 270 comprises one or more beamforming filters adapted to contain cleaned copies of ATFs for one or more given directions and/or environments.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 6). The sound filter module 280 provides the sound filters to the transducer array 210. In some embodiments, the sound filters may cause positive or negative amplification of sounds as a function of frequency.

Determination of Acoustic Transfer Functions for User Authentication

Figure 3:
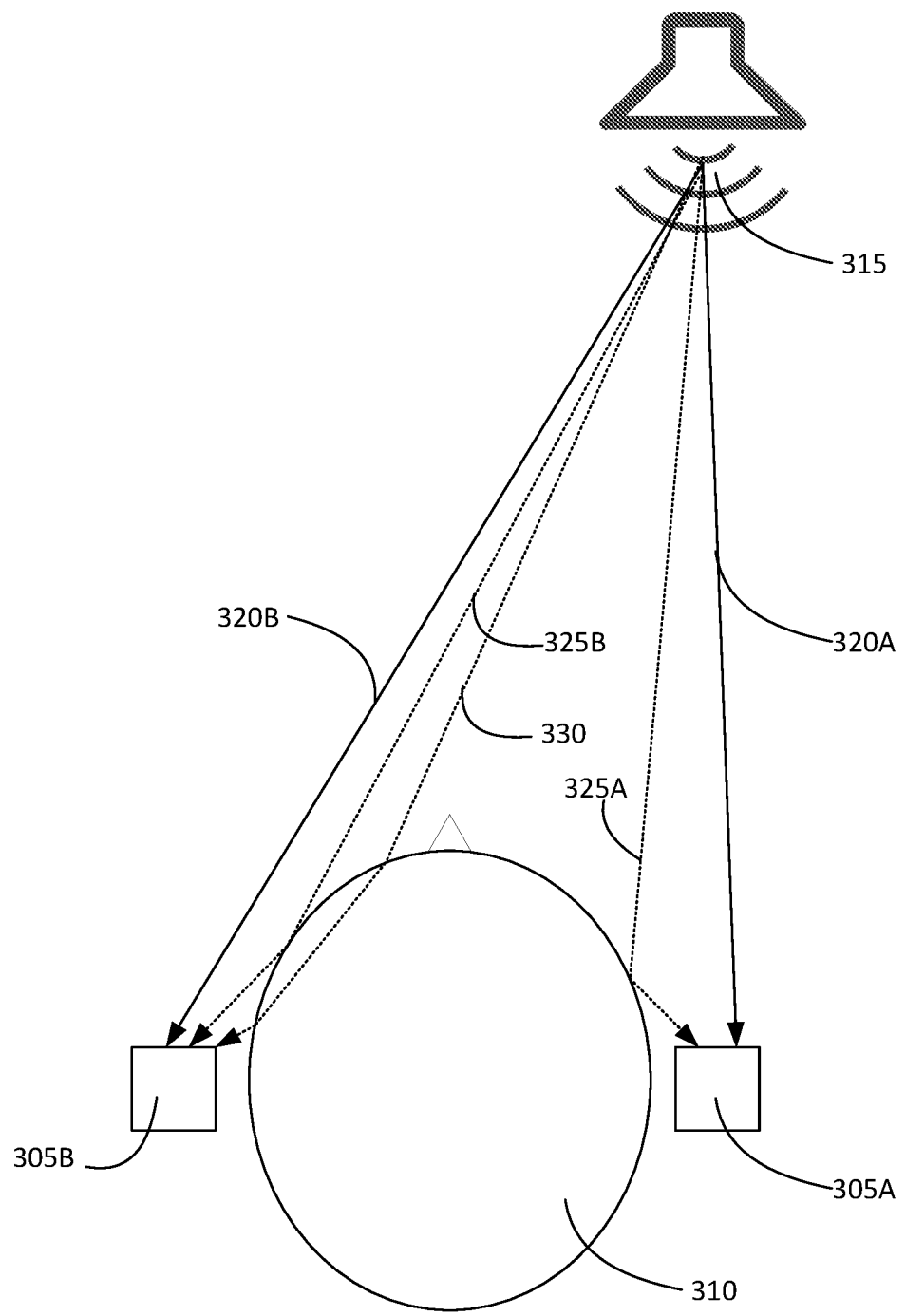
FIG. 3 is a diagram showing sounds in a local area can be detected by a sensor array and used to determine an acoustic transfer function, in accordance with some embodiments.

FIG. 3 is a diagram showing sounds in a local area can be detected by a sensor array and used to determine an acoustic transfer function, in accordance with some embodiments. A user may wear a wearable device having acoustic sensors 305A and 305B (collectively, acoustic sensors 305) near their head 310. Although FIG. 3 illustrates only two acoustic sensors 305 in particular locations relative to the user's head 310, it is understood that in other embodiments, the audio system of the wearable device may include additional acoustic sensors, acoustic sensors in different locations relative to the user's head 310, or some combination thereof.

A sound originating from a source location 315 in the local area may produce sound waves that can be detected by the acoustic sensors 305. The sound detected at each of the acoustic sensors 305A and 305B may include direct sound 320A and 320B, respectively, as well as indirect sound. The indirect sound may include reflected sound 325A, 325B that is reflected off the user's head 310, as well as sound 330 that has travelled through at least a portion of the user's head 310. In some embodiments, the direct sound may include sound traveling through different mediums, such as the user's head 310. In some embodiments, the indirect sound may further include sound reflected off other objects in the local area (not shown). In some embodiments, the acoustic sensors will detect the direct sound earliest in time, due to the direct sound having a most direct path from the source location 315 to each of the acoustic sensors 305 (e.g., typically a line of sight path, unless occluded), while indirect sounds may be detected later in time. Due to the proximity of the user's head 310 to the acoustic sensors 305, indirect sounds corresponding to reflecting off the user's head may closely interact with the direct sound, while sounds corresponding to reflections off of other objects in the local area (e.g., walls, furniture, etc.) may be detected at the acoustic sensors 305 later in time.

The audio system determines an acoustic transfer function based upon the sound detected at each of the acoustic sensors 305. Due to the different locations of the acoustic sensors 305, the direct sound 320A and 320B is detected by the acoustic sensors 305A and 305B at different times. In addition, the magnitude of the direct sound 320 detected at each acoustic sensor 305 may be different, based upon the properties of any intervening objects (such as the shape, size, and/or density of the user's head 310) between the source location 315 and each of the acoustic sensors 305. The indirect sound (including reflected sound 325A, 325B and through-head sound 330) detected at each acoustic sensor 305A and 305B may be also different, based upon the position of the user's head 310 relative to the source location 315, the geometry and density of the user's head 310, etc. As such, for a given sound originating from the same source location 315, the differences between the direct and indirect sound detected at each acoustic sensor 305 will be different for different users having different head shapes, allowing for different acoustic transfer functions to be determined for the different users.

In some embodiments, the determined acoustic transfer function is a relative transfer function which corresponds to a relative difference between the sounds detected at two or more microphones. Because the relative transfer function reflects the relative difference between the detected sounds at different microphones, sounds having different auditory content originating from the same location can be used to determine the relative transfer function for a user. This allows for authentication of a user by comparing a first transfer function determined for the user based upon a first sound originating from a known source location with a second transfer function determined for the user based upon a second sound originating from the source location, even if the first and second sounds are different.

In embodiments where the sensor array of the audio system contains more than two acoustic sensors, a predetermined acoustic sensor may be designated as a reference acoustic sensor, wherein the determined relative transfer function indicates a relative difference between sounds detected at each of the remaining acoustic sensors and the reference acoustic sensor. In some embodiments, the audio system determines a set of acoustic transfer functions, each corresponding to a ratio between sounds detected at two acoustic sensors of the sensor array.

In some embodiments, the audio system analyzes the sound received at each acoustic sensor 305, and extracts a portion of the sound from the aggregate sound detected at each acoustic sensor. The extracted portion of the sound may correspond to sound received from the source location within a window of time from which a first portion of direct sound from the source location is received. As such, the extracted direct sound may include sound that has travelled to each acoustic sensor directly through air (e.g., sound 320), direct sound that has travelled through other mediums, such as the user's head 310, and/or indirect sound reflected off portions of the user's head. On the other hand, the time window may be selected such that the extracted sound will not contain indirect sound reflected off objects that are further away (e.g., other parts of the user's body, other objects in the local area). In some embodiments, the direct sound is identified as arriving earlier at each acoustic sensor 305 relative to the indirect sound, and having a larger amplitude. The relative transfer function is determined based upon a difference between the extracted sound detected at each of the acoustics sensors, which reflects the relative locations of the acoustics sensors 305 from the source location 315, as well as any effects from the user's head 310. In some embodiments, the difference between the extracted sound detected at each acoustic sensor is determined as a ratio. Because only the extracted sound detected by the acoustic sensors is used to determine the relative transfer function, effects from indirect sound due to reflections from objects in the local area other than the user's head 310 are ignored and will not affect the determined acoustic transfer function. As such, the determined acoustic transfer function will reflect a time delay and a frequency response of sound detected at the acoustic sensors 305, based upon the position of the audio system relative to the source location, effects on the direct sound due to the user's head 310, as well as a frequency range of the detected sound. Additional examples of methods for extracting direct sound from received sound and determining acoustic transfer functions are described in U.S. patent application Ser. No. 16/015,879, titled "Audio System for Dynamic Determination of Personalize Acoustic Transfer Functions", which is hereby incorporated by reference in its entirety.

Acoustic Transfer Function Authentication Process Flow

Figure 4:
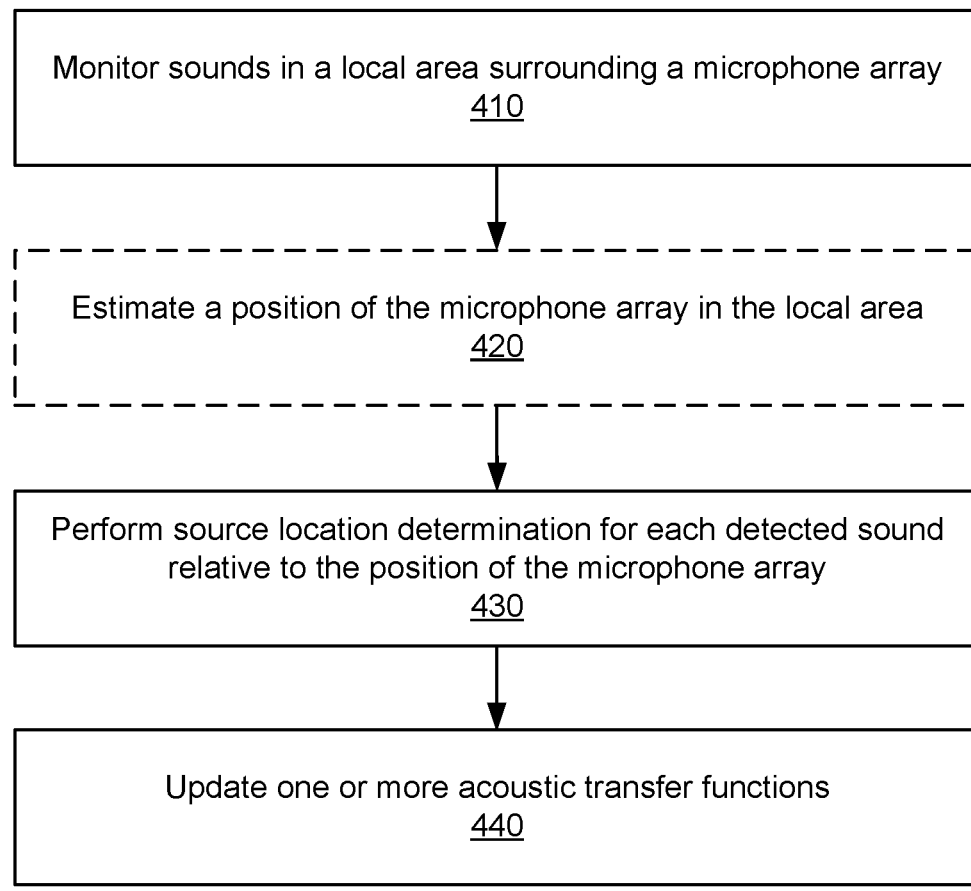
FIG. 4 is a flowchart illustrating a process of generating and updating an acoustic transfer function of a wearable device including an audio system, in accordance with one or more embodiments.

FIG. 4 is a flowchart illustrating a process 400 of generating and updating an acoustic transfer function of an eyewear device (e.g., wearable device 100) including an audio system (e.g., audio system 200), in accordance with one or more embodiments. In one embodiment, the process of FIG. 4 is performed by components of the audio system. Other entities may perform some or all of the steps of the process in other embodiments (e.g., a console). Likewise, embodiments may include different and/or additional steps, or perform the steps in different orders.

The audio system monitors 410 sounds in a local area surrounding a sensor array on the eyewear device. The sensor array may detect sounds such as uncontrolled sounds and controlled sounds that occur in the local area. Each detected sound may be associated with a frequency, an amplitude, a duration, or some combination thereof. In some embodiments, the audio system stores the information associated with each detected sound in an audio data set.

In some embodiments, the audio system optionally estimates 420 a position of the sensor array in the local area. The estimated position may include a location of the sensor array and/or an orientation of the wearable device or a user's head wearing the wearable device, or some combination thereof. In one embodiment, the audio system may include one or more sensors that generate one or more measurement signals in response to motion of the sensor array. The audio system may estimate a current position of the sensor array relative to an initial position of the sensor array. In another embodiment, the audio system may receive position information of the eyewear device from an external system (e.g., an imaging assembly, an AR or VR console, a SLAM system, a depth camera assembly, a structured light system, etc.). In some embodiments, knowledge of the location of the device relative to the environment may be used to help remove audio data corresponding to reflections from objects in the environment, allowing for calculated acoustic transfer functions to more accurately reflect the geometry of the user's head by reducing effects from reflected sounds from other objects in the environment.

The audio system performs 430 a source location determination for each detected sound relative to the position of the sensor array. In some embodiments, the source location determination is based upon one or more DoA estimations for each acoustic sensor of the microphone, indicating an estimated direction from which the detected sound arrived at the acoustic sensor of the sensor array. The DoA estimation may be represented as a vector between an estimated source location of the detected sound and the position of the eyewear device within the local area. The source location may be determined based upon triangulation of the estimated DoAs. In some embodiments, the audio system may perform 430 a source location determination for detected sounds associated with a parameter that meets a parameter condition. For example, a parameter condition may be met if a parameter is above or below a threshold value or falls within a target range.

The audio system updates 440 one or more acoustic transfer functions. The acoustic transfer function may be an ATF or an HRTF. An acoustic transfer function represents the relationship between a sound at its source location and how the sound is detected. Accordingly, each acoustic transfer function is associated with a different source location of a detected sound (relative to the position of the sensor array). As a result, the audio system may update 440 a plurality of acoustic transfer functions for a particular source location.

In some embodiments, the eyewear device may update 440 two HRTFs, one for each ear of a user, for a particular source location. In some embodiments, the audio system generates one or more acoustic transfer functions that are each associated with a relative ratio of sound detected at different acoustic sensors of the sensor array.

As different sounds from the local area are detected, the audio system may generate one or more new acoustic transfer functions or update 440 one or more pre-existing acoustic transfer functions associated with the source location accordingly. The process 400 may be continuously repeated as a user wearing the sensor array moves through the local area, or the process 400 may be initiated upon detecting sounds via the sensor array.

FIG. 5 is a flowchart illustrating a process 500 of identifying a user of a wearable device including an audio system based upon one or more determined acoustic transfer functions, in accordance with one or more embodiments. The audio system receives 510 an indication that a user is wearing the wearable device. In some embodiments, the indication may be based upon an operating state of the wearable device (e.g., the wearable device being switched on, one or more functionalities being turned on, etc.), one or more sensor readings (e.g., a proximity sensor such as an IR proximity sensor indicating that a user is wearing the device), one or more user inputs (e.g., the user pressing a particular button after putting on the wearable device), or some combination thereof.

As discussed above, while it is possible for acoustic transfer functions for the user to be determined based upon sounds in the local area and without requiring any input from the user, in some embodiments, the audio system may cause 520 the emission of a controlled sound and/or prompt the user to generate one or more sounds, in order to facilitate the determination of acoustic transfer functions for the user. For example, the audio system may cause a speaker controlled by or in communication with the wearable device to produce one or more sounds. In some embodiments, the user may be prompted to speak one or more predetermined phrases, clap their hands, and/or the like. In embodiments where the personalized functions of known users include acoustic transfer functions calculated based upon spoken phrases by the users during a calibration operation, the prompting of the user to speak one or more phrases may ensure that acoustic transfer functions corresponding to particular source locations can be obtained, due to the fact that the mouth position of a user will generally be in a similar location when wearing the device.

The audio system determines 530 at least one acoustic transfer function for the user, based upon sounds detected at a sensor array of the audio system (e.g., a sensor array). For example, the acoustic sensors of the sensor array may be located on a headset worn on the head of the user. The sound propagates from the source location to each of the acoustic sensors. The acoustic sensors generate audio data based on the captured sound. The sound is transformed by reflection off various portions of the user's head (e.g., head, face, surfaces of the ear) and/or the propagation through the user's head, and this transformation may be different for different users. The transformation may include a frequency response, a time delay, and/or an amplitude change. The at least one acoustic transfer function may be determined based on a ratio of audio data captured by acoustic sensors at different locations. In some embodiments, a set of acoustic transfer functions may be determined. For example, ratios of audio data between pairs of acoustic sensors and for each discrete source location may be used to determine the set of acoustic transfer functions.

In some embodiments, the sounds may be controlled sounds (e.g., emitted by a speaker controlled by or in communication with the wearable device, or spoken by the user in response to a prompt). In other embodiments, the detected sounds may comprise uncontrolled sounds within the local area of the device. In some embodiments, the audio system determines the at least one acoustic transfer function using the process illustrated in FIG. 4. The determined acoustic transfer function may comprise a relative transfer function indicate relative differences in sounds detected by each microphone of the sensor array. In some embodiments, each determined acoustic transfer function is associated with a particular source location, a particular frequency range, or a combination thereof.

The audio system compares 540 the at least one determined acoustic transfer function for the user to one or more stored acoustic transfer functions associated with known users. In some embodiments, the audio system identifies one or more stored personalized functions associated with a location the same as or within a threshold distance of the source location associated with the at least one determined acoustic transfer function to be compared with the determined acoustic transfer function. In some embodiments, the identified personalized functions may be determined as functions associated with a common frequency range as the determined acoustic transfer function. In some embodiments, the audio system determines one or more confidence values based upon the comparison between the at least one determined acoustic transfer function and the identified stored acoustic transfer functions associated with each known user. In some embodiments, a set of acoustic transfer functions (e.g., each corresponding to a ratio generated using a different acoustic sensor pair) may be compared to a corresponding set of stored acoustic transfer functions. In some embodiment, the comparisons of array transfer functions to the stored set of acoustic transfer functions may be done using machine learning and statistical learning algorithms, including similarity learning, representation learning and distance metrics computation. In some embodiments, such specific models/algorithms include kernalized nearest neighbors, neural networks, non-linear transformations (like single or multi index models), generalized principal component analysis, locally linear embedding, isometric mapping, and/or the like.

The audio system identifies 550 the user based upon the comparison of acoustic transfer functions. For example, if the confidence obtained by comparing the determined one or more acoustic transfer functions with the stored acoustic transfer functions of a first known user meets a threshold value, the user may be identified as the first known user. In some embodiments, the comparison result may be combined with one or more additional authentication methods (e.g., voice, fingerprints, etc.) to identify or authenticate the user. For example, if the user was prompted to speak a predetermined phrase (e.g., at 520), the sounds corresponding to the speech of the user may be used to determine an acoustic transfer function for the user, as well as perform voice recognition on the user. In some embodiments, if the user is identified as a known user, the device may perform one or more actions personalized to the user, such as automatically configuring one or more settings in accordance with one or more stored user preferences, allowing the user to access personalized content, etc. On the other hand, if the user is not able to be identified as a known user, the device may prevent the user from accessing personalized content of known users, and/or restricting one or more functionalities. In some embodiments, the audio system may prompt the authorized user to create a user profile (e.g., undergo a calibration operation) so that they can become a known user of the device.

By using the audio system of a wearable device to dynamically determine acoustic transfer functions for a user wearing the wearable device, the user can thus be identified as a known user of the device by comparing the determined acoustic transfer functions with previously determined and stored acoustic transfer functions associated with the known user. This allows for user identification and/or authentication in a hands-free manner that is unobtrusive to the user (especially if using uncontrolled sounds in the local area, thus requiring no actions on the part of the user) and/or able to be easily cross-referenced with other authentication methods (e.g., voice recognition) for additional security. In addition, the determined acoustic transfer functions may be further used in providing audio content to the user during operation of the wearable device.

Example System Environment

Figure 6:
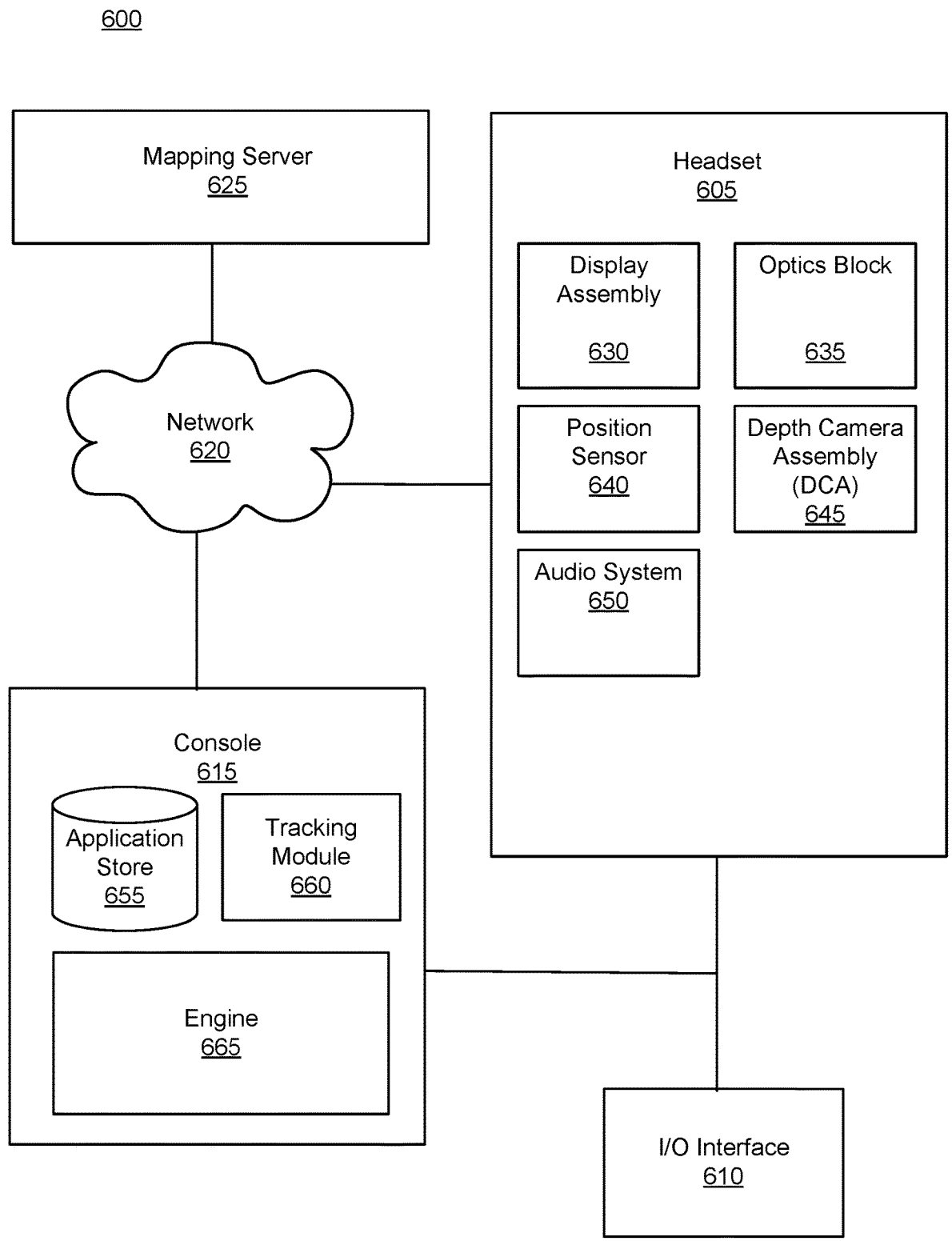
FIG. 6 is a system environment of an eyewear device including an audio system, in accordance with one or more embodiments.

FIG. 6 is a system 600 that includes a headset 605, in accordance with one or more embodiments. In some embodiments, the headset 605 may be the wearable device 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is an embodiment of the audio system 200 described above. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625, and use the sound filters to provide audio content to the user.

The audio system 650 may further determine one or more acoustic transfer functions for a user, based upon sounds transmitted within a local area of the headset 605. The determined acoustic transfer functions may be based upon a size, shape, and/or density of a portion of the user's body (e.g., the user's head, face, ears, torso, etc.), and as such may be different for different wearers of the headset 605. In some embodiments, the determined acoustic transfer functions can be used to provide personalized audio content to the user. In addition, the acoustic transfer functions may be used to identify or authenticate the user by comparing the determined functions with acoustic transfer functions previously determined and associated with known users. Based upon the identification or authentication, one or more security functions (e.g., logging the user into a user account, preventing the user from logging into a user account, allowing or preventing the user from accessing personalized data, etc.) can be performed.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An audio system, comprising:
a sensor array that includes a plurality of acoustic sensors that are configured to detect a sound transmitted within a local area of the audio system; and
a controller configured to:
  determine a source location of the detected sound indicating a location within the local area relative to a position of the audio system, based upon a known positional relationship between the plurality of acoustic sensors and one or more direction of arrival (DoA) estimates produced using the sound detected by the plurality of acoustic sensors;
  determine at least one acoustic transfer function based in part on the detected sound, wherein the at least one acoustic transfer function defines a transformation of the sound caused in part by a head of a user of the audio system;
  associate the determined at least one acoustic transfer function with the determined source location;
  identify at least one stored acoustic transfer function corresponding to an authorized user, the at least one stored acoustic transfer function selected from a plurality of stored acoustic transfer functions corresponding to the authorized user based upon the determined source location; and
  identify the user based upon a comparison of the determined at least one acoustic transfer function and the identified at least one stored acoustic transfer function.

2. The audio system of claim 1, wherein:
the plurality of acoustic sensors includes a first acoustic sensor configured to generate a first audio signal from the sound and a second acoustic sensor configured to generate a second audio signal from the sound; and
the controller is configured to determine the at least one acoustic transfer function by determining a ratio between the first audio signal and the second audio signal.

3. The audio system of claim 2, wherein the controller is configured to determine a set of acoustic transfer functions, each based upon a ratio between two acoustic sensors of the plurality of acoustic sensors, and to identify the user based upon the determined set of acoustic transfer functions.

4. The audio system of claim 1, wherein a plurality of acoustic sensors comprise a pair of acoustic sensors located proximate to each ear of the user, and the at least one acoustic transfer function corresponds to a head-related transfer function (HRTF).

5. The audio system of claim 1, wherein the sensor array is located on a headset.

6. The audio system of claim 5, further comprising a proximity sensor, and wherein the controller is further configured to:
  determine if the user is wearing the headset based upon an input received from the proximity sensor; and
  determine the at least one acoustic transfer function responsive to a determination that the user is wearing the headset.

7. The audio system of claim 1, wherein the identified at least one stored acoustic transfer function is associated with a source location that is within a threshold distance of the determined source location.

8. The audio system of claim 1, wherein the controller is further configured to cause a speaker to emit the sound.

9. The audio system of claim 1, wherein the sound is generated by the user.

10. The audio system of claim 1, wherein the controller is further configured to:
  perform one or more security functions based upon a result of the comparison, wherein the one or more security functions comprises authorizing access by the user to personalized data or setting a configuration of a wearable device based upon one or more stored user preferences.

11. The audio system of claim 1, wherein the controller is further configured to:
  extract a portion of the detected sound corresponding a sound received from the source location within a designated window of time from when a first portion of direct sound of the detected sound is received by the plurality of acoustic sensors;
  determine the at least one acoustic transfer function based upon the extracted portion of the detected sound.

12. The audio system of claim 1, wherein the source location is determined based upon triangulation of the DoA estimates.

13. The audio system of claim 1, wherein identifying at least one stored acoustic transfer function comprises identifying a stored acoustic transfer function of the plurality of stored acoustic transfer functions associated with a source location within at least a threshold distance of the determined source location.

14. The audio system of claim 1, wherein the controller is further configured to prompt the user to move about the local area, to detect sounds associated with a plurality of different source locations.

15. A method, comprising:
detecting a sound transmitted within a local area of a headset using a sensor array, the sensor array including a plurality of acoustic sensors;
determining a source location of the detected sound indicating a location within the local area relative to a position of the audio system, based upon a known positional relationship between the plurality of acoustic sensors and one or more direction of arrival (DoA) estimates produced using the sound detected by the plurality of acoustic sensors;
determining at least one acoustic transfer function associated with a user based in part on the detected sound, wherein the at least one acoustic transfer function defines a transformation of the sound cause in part by a head of a user of the headset;
associating the determined at least one acoustic transfer function with the determined source location;
identifying at least one stored acoustic transfer function corresponding to an authorized user, the at least one stored acoustic transfer function selected from a plurality of stored acoustic transfer functions corresponding to the authorized user based upon the determined source location; and
identifying the user based upon a comparison of the determined at least one acoustic transfer function and the identified at least one stored acoustic transfer function.

16. The method of claim 15, wherein:
the plurality of acoustic sensors includes a first acoustic sensor configured to generate a first audio signal from the sound and a second acoustic sensor configured to generate a second audio signal from the sound; and wherein determining the at least one acoustic transfer function comprises determining a ratio between the first audio signal and the second audio signal.

17. The method of claim 15, further comprising:
determining if the user is wearing the headset base based upon an input received from a proximity sensor of the headset; and
determining the at least one acoustic transfer function responsive to a determination that the user is wearing the headset.

18. The method of claim 15, wherein the at least one stored acoustic transfer function is associated with a source location that is within a threshold distance of the determined source location.

19. The method of claim 15, further comprising:
performing one or more security functions based upon a result of the comparison, wherein the one or more security functions comprises authorizing access by the user to personalized data or setting a configuration of the headset based upon one or more stored user preferences.

20. A non-transitory computer-readable medium storing instructions that, when executed by one or more processors, cause the one or more processors to perform operations comprising:

detecting a sound transmitted within a local area of a headset using a sensor array, the sensor array including a plurality of acoustic sensors;

determining a source location of the detected sound indicating a location within the local area relative to a position of the audio system, based upon a known positional relationship between the plurality of acoustic sensors and one or more direction of arrival (DoA) estimates produced using the sound detected by the plurality of acoustic sensors;

determining at least one acoustic transfer function associated with a user based in part on the detected sound, wherein the at least one acoustic transfer function defines a transformation of the sound caused in part by a head of a user of the headset;

associating the determined at least one acoustic transfer function with the determined source location;

identifying at least one stored acoustic transfer function corresponding to an authorized user, the at least one stored acoustic transfer function selected from a plurality of stored acoustic transfer functions corresponding to the authorized user based upon the determined source location; and identifying the user based upon a comparison of the determined at least one acoustic transfer function and the identified at least one stored acoustic transfer function.

* * * * *

UNITED STATES PATENT AND TRADEMARK OFFICE
CERTIFICATE OF CORRECTION

PATENT NO. : 11,526,589 B2
APPLICATION NO. : 16/526498
DATED : December 13, 2022
INVENTOR(S) : Jacob Ryan Donley Page 1 of 1

It is certified that error appears in the above-identified patent and that said Letters Patent is hereby corrected as shown below:

In the Claims

In Column 30, Claim 11, Line 15, delete "corresponding a" and insert -- corresponding to a --, therefor.

Signed and Sealed this
Twenty-fifth Day of April, 2023

Katherine Kelly Vidal
*Director of the United States Patent and Trademark Office*